US 6,726,592 B2

(12) United States Patent
Kotani (10) Patent No.: US 6,726,592 B2
(45) Date of Patent: Apr. 27, 2004

(54) POWER OUTPUT APPARATUS AND AUTOMOBILE WITH POWER OUTPUT APPARATUS MOUNTED THEREON (75) Inventor: Takeshi Kotani, Nisshin (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/251,822

(22) Filed: Sep. 23, 2002

(65) Prior Publication Data
US 2003/0064854 A1 Apr. 3, 2003

(30) Foreign Application Priority Data
Sep. 28, 2001 (JP) ......................................... 2001-303453

(51) Int. Cl.$^7$ .............................................. B60K 41/24
(52) U.S. Cl. ........................ 477/4; 477/5; 475/2; 475/4
(58) Field of Search ................................ 475/1, 2, 3, 4, 475/5; 477/2, 3, 4, 5, 6

(56) References Cited

U.S. PATENT DOCUMENTS

| 5,468,194 A | * | 11/1995 | Hayashi .......................... 477/3 |
| 5,823,281 A | | 10/1998 | Yamaguchi et al. | |
| 6,251,037 B1 | * | 6/2001 | Baumgaertner et al. ....... 475/2 |
| 6,371,878 B1 | * | 4/2002 | Bowen .......................... 475/5 |
| 6,575,865 B2 | * | 6/2003 | Takenaka et al. .............. 475/5 |
| 6,579,201 B2 | * | 6/2003 | Bowen .......................... 475/5 |

FOREIGN PATENT DOCUMENTS

| DE | 4124479 | * | 1/1993 | ................ 180/65.2 |
| JP | A 9-109694 | | 4/1997 | |
| JP | A 9-117010 | | 5/1997 | |
| JP | A 11-332020 | | 11/1999 | |
| JP | 2000343964 | * | 12/2000 | |
| JP | A 2001-1773 | | 1/2001 | |

* cited by examiner

Primary Examiner—Ha Ho
(74) Attorney, Agent, or Firm—Oliff & Berridge, PLC (57) ABSTRACT A hybrid vehicle of the present invention includes a brake 62 that fixes a sun gear shaft 31a linked with a sun gear 31 of a power distribution integration mechanism 30, and a clutch 64 that mechanically connects a drive shaft 36 with a motor MG2 and releases the mechanical connection of the drive shaft 36 with the motor MG2. In the case of a relatively low vehicle speed, the power of an engine 22 is subjected to torque conversion by the power distribution integration mechanism and motors MG1 and MG2 and is output to the drive shaft 36, while the brake 62 is in OFF position and the clutch 64 is in ON position. In the case of a relatively high vehicle speed, on the other hand, the power of the engine 22 is directly output to the drive shaft 36, while the brake 62 is in ON position and the clutch 64 is in OFF position.

16 Claims, 4 Drawing Sheets

POWER OUTPUT APPARATUS AND AUTOMOBILE WITH POWER OUTPUT APPARATUS MOUNTED THEREON

BACKGROUND OF THE INVENTION

1. Field of the Invention

The present invention relates to a power output apparatus and an automobile with the power output apparatus mounted thereon.

2. Description of the Prior Art

One proposed power output apparatus includes a planetary gear unit linked with an output shaft of an internal combustion engine, a rotational shaft of an electric generator, and a drive shaft as a rotational shaft of an electric motor, as well as a brake mechanism that stops rotation of the rotational shaft of the electric generator (for example, JAPANESE PATENT LAID-OPEN GAZETTE No. 9-117010). In this power output apparatus, the power output from the internal combustion engine and input into a carrier of the planetary gear unit is partly output to the drive shaft connecting with a ring gear of the planetary gear unit by application of a reaction force by means of the electric generator connecting with a sun gear of the planetary gear unit. The residual power is taken out as electric power, which is utilized for torque output from the electric motor to the drive shaft. Under such control, the power of the internal combustion engine driven at a drive point of high efficiency is subjected to torque conversion and is output to the drive shaft. The brake mechanism stops the rotation of the electric generator according to the requirements, thus reducing the energy loss due to the electric generator and enhancing the total energy efficiency of the whole power output apparatus.

This prior art power output apparatus, however, can not reduce the energy loss due to the electric motor, while activating the brake mechanism to stop the rotation of the electric generator and reduce the energy loss due to the electric generator. In the case where the brake mechanism functions to stop the rotation of the electric generator, the sun gear of the planetary gear unit is fixed. This prevents the drive point of the internal combustion engine from being set freely and may cause the internal combustion engine to be driven in a driving area of rather poor efficiency. One possible measure against this problem stops the rotation of the electric generator by means of the brake mechanism only under the condition that the internal combustion engine is in a driving area of high efficiency. This method, however, reduces the chance of stopping the rotation of the electric generator and thereby decreases the chance of enhancing the total energy efficiency of the power output apparatus.

SUMMARY OF THE INVENTION

The object of the present invention is thus to enhance the total energy efficiency of a power output apparatus and a vehicle with the power output apparatus mounted thereon.

In order to achieve at least a part of the aforementioned objects, the power output apparatus and automobile with power output apparatus mounted thereon of the present invention is structured as follows.

A power output apparatus of the present invention is a power output apparatus that outputs power to a drive shaft, the power output apparatus including: an internal combustion engine; a drive shaft electric motor that is mechanically linked with the drive shaft and inputs and outputs power into and from the drive shaft; a triaxial power input output module that is connected to three shafts, that is, an output shaft of the internal combustion engine, the drive shaft, and a rotational shaft and, when powers input into and output from any two shafts among the three shafts are specified, determines power input into and output from a residual shaft, based on the specified powers; a rotational shaft electric motor that inputs and outputs power into and from the rotational shaft; a rotation stop module that fixes the rotational shaft to stop rotation of the rotational shaft; and an electric motor connecting and releasing module that mechanically connects the drive shaft with the drive shaft electric motor and releases the mechanical connection of the drive shaft with the drive shaft electric motor.

In the power output apparatus of the present invention, when the rotation stop module is not activated and the electric motor connecting and releasing module functions to mechanically connect the drive shaft with the drive shaft electric motor, the power of the internal combustion engine is subjected to torque conversion by the triaxial power input output module, the drive shaft electric motor, and the rotational shaft electric motor, and is output to the drive shaft. Under such conditions, when the rotation stop module is activated to fix the rotational shaft and stop rotation of the rotational shaft, the power of the internal combustion engine is directly output to the drive shaft. In this state, the rotational shaft electric motor is stopped, so that energy loss of the rotational shaft electric motor is decreased to zero. When the electric motor connecting and releasing module functions to release the mechanical connection of the drive shaft with the drive shaft electric motor, the drive shaft electric motor is also stopped. This decreases the energy loss of the drive shaft electric motor to zero. The arrangement of the present invention thus effectively enhances the total energy efficiency of the whole power output apparatus.

Further, in the power output apparatus of the present invention structured in this way, there may be provide with a controller that controls the rotation stop module to stop the rotation of the rotational shaft and controls the electric motor connecting and releasing module to release the mechanical connection of the drive shaft with the drive shaft electric motor, when a predetermined rotation stop condition is fulfilled. Moreover, in the power output apparatus of the present invention, there may be provided with a controller that controls the rotation stop module to cancel the stop of the rotation of the rotational shaft and controls the electric motor connecting and releasing module to mechanically connect the drive shaft with the drive shaft electric motor, when a predetermined stop cancellation condition is fulfilled. In one preferable embodiment of these applications, the power output apparatus is further provided with a revolving speed sensor that measures a revolving speed of the drive shaft. The predetermined rotation stop condition is that the revolving speed of the drive shaft measured by the revolving speed sensor is not less than a first changeover revolving speed. The predetermined stop cancellation condition is that the revolving speed of the drive shaft measured by the revolving speed sensor is not greater than a second changeover revolving speed.

Moreover, in the power output apparatus of the present invention, there may be provided with a revolving speed sensor that measures a revolving speed of the drive shaft; and     a controller that controls the rotation stop module to stop the rotation of the rotational shaft and controls the electric motor connecting and releasing module to release the mechanical connection of the drive shaft with the drive shaft electric motor, when a first changeover condition is fulfilled where the revolving speed of the drive shaft measured by the revolving speed sensor is over a preset changeover revolving speed range, the controller controlling the rotation stop module to cancel the stop of the rotation of the rotational shaft and controlling the electric motor connecting and releasing module to mechanically connect the drive shaft with the drive shaft electric motor, when a second changeover condition is fulfilled where the revolving speed of the drive shaft measured by the revolving speed sensor is below the preset changeover revolving speed range. In this case, the triaxial power input output module may be regulated to make a revolving speed of the rotational shaft within a predetermined revolving speed range including a value '0', when the drive shaft is rotated in the preset changeover revolving speed range against a general required power, the internal combustion engine is driven to enable a power corresponding to the general required power to be efficiently output from the internal combustion engine, and the rotational shaft electric motor and the drive shaft electric motor are driven to output the general required power to the drive shaft. Further, the triaxial power input output module may be regulated to enable the internal combustion engine to be driven in a predetermined driving area of high efficiency, when the drive shaft is rotated in the preset changeover revolving speed range against a general required power, and the rotational shaft electric motor and the drive shaft electric motor are driven in order to cause a power corresponding to the general required power output from the internal combustion engine to be transmitted to the drive shaft as the general required power and in order to rotate the rotational shaft within a predetermined revolving speed range including a value '0'.

Further, in the power output apparatus of the present invention, there may be provided with a transmission that is interposed between the drive shaft electric motor and the drive shaft to change an input revolving speed and output a resulting revolving speed.

An automobile of the present invention is an automobile, including:

an internal combustion engine;

a drive shaft electric motor that is mechanically linked with a drive shaft, which is connected to an axle, and inputs and outputs power into and from the drive shaft;

a triaxial power input output module that is connected to three shafts, that is, an output shaft of the internal combustion engine, the drive shaft, and a rotational shaft and, when powers input into and output from any two shafts among the three shafts are specified, determines power input into and output from a residual shaft, based on the specified powers;

a rotational shaft electric motor that inputs and outputs power into and from the rotational shaft;

a rotation stop module that fixes the rotational shaft to stop rotation of the rotational shaft;

an electric motor connecting and releasing module that mechanically connects the drive shaft with the drive shaft electric motor and releases the mechanical connection of the drive shaft with the drive shaft electric motor;

a vehicle speed sensor that measures a vehicle speed; and a controller that controls the rotation stop module to stop the rotation of the rotational shaft and controls the electric motor connecting and releasing module to release the mechanical connection of the drive shaft with the drive shaft electric motor, when a first changeover condition is fulfilled where the vehicle speed measured by the vehicle speed sensor is over a preset changeover vehicle speed range, the controller controlling the rotation stop module to cancel the stop of the rotation of the rotational shaft and controlling the electric motor connecting and releasing module to mechanically connect the drive shaft with the drive shaft electric motor, when a second changeover condition is fulfilled where the vehicle speed measured by the vehicle speed sensor is below the preset changeover vehicle speed range.

In the automobile of the present invention, when the rotation stop module is not activated and the electric motor connecting and releasing module functions to mechanically connect the drive shaft with the drive shaft electric motor, the power of the internal combustion engine is subjected to torque conversion by the triaxial power input output module, the drive shaft electric motor, and the rotational shaft electric motor, and is output to the drive shaft connecting with the axle. Under such conditions, when the rotation stop module is activated to fix the rotational shaft and stop rotation of the rotational shaft, the power of the internal combustion engine is directly output to the drive shaft. In this state, the rotational shaft electric motor is stopped, so that energy loss of the rotational shaft electric motor is decreased to zero. In the automobile of the present invention, the controller controls the rotation stop module to stop the rotation of the rotational shaft and controls the electric motor connecting and releasing module to release the mechanical connection of the drive shaft with the drive shaft electric motor, when a first changeover condition is fulfilled where the observed vehicle speed is over a preset changeover vehicle speed range. This results in inducing direct output of the power from the internal combustion engine to the drive shaft. The controller controls the rotation stop module to cancel the stop of the rotation of the rotational shaft and controls the electric motor connecting and releasing module to mechanically connect the drive shaft with the drive shaft electric motor, when a second changeover condition is fulfilled where the observed vehicle speed is below the preset changeover vehicle speed range. This results in canceling the direct output of the power from the internal combustion engine to the drive shaft. The arrangement of the invention thus effectively enhances the total energy efficiency of the automobile according to the vehicle speed.

In the automobile of the present invention, the triaxial power input output module may be regulated to make a revolving speed of the rotational shaft within a predetermined revolving speed range including a value '0' when the drive shaft is rotated in the preset changeover revolving speed range against a general required power, the internal combustion engine is driven to enable a power corresponding to the general required power to be efficiently output from the internal combustion engine, and the rotational shaft electric motor and the drive shaft electric motor are driven to output the general required power to the drive shaft. Further, the triaxial power input output module may be regulated to enable the internal combustion engine to be driven in a predetermined driving area of high efficiency, when the drive shaft is rotated in the preset changeover revolving speed range against a general required power, and the rotational shaft electric motor and the drive shaft electric motor are driven in order to cause a power corresponding to the general required power output from the internal combustion engine to be transmitted to the drive shaft as the general required power and in order to rotate the rotational shaft within a predetermined revolving speed range including a value '0'.

In one preferable application of the present invention, the automobile is further provided with a transmission that is interposed between the drive shaft electric motor and the drive shaft to change an input revolving speed and output a resulting revolving speed.

DESCRIPTION OF THE PREFERRED EMBODIMENTS

Figure 1:
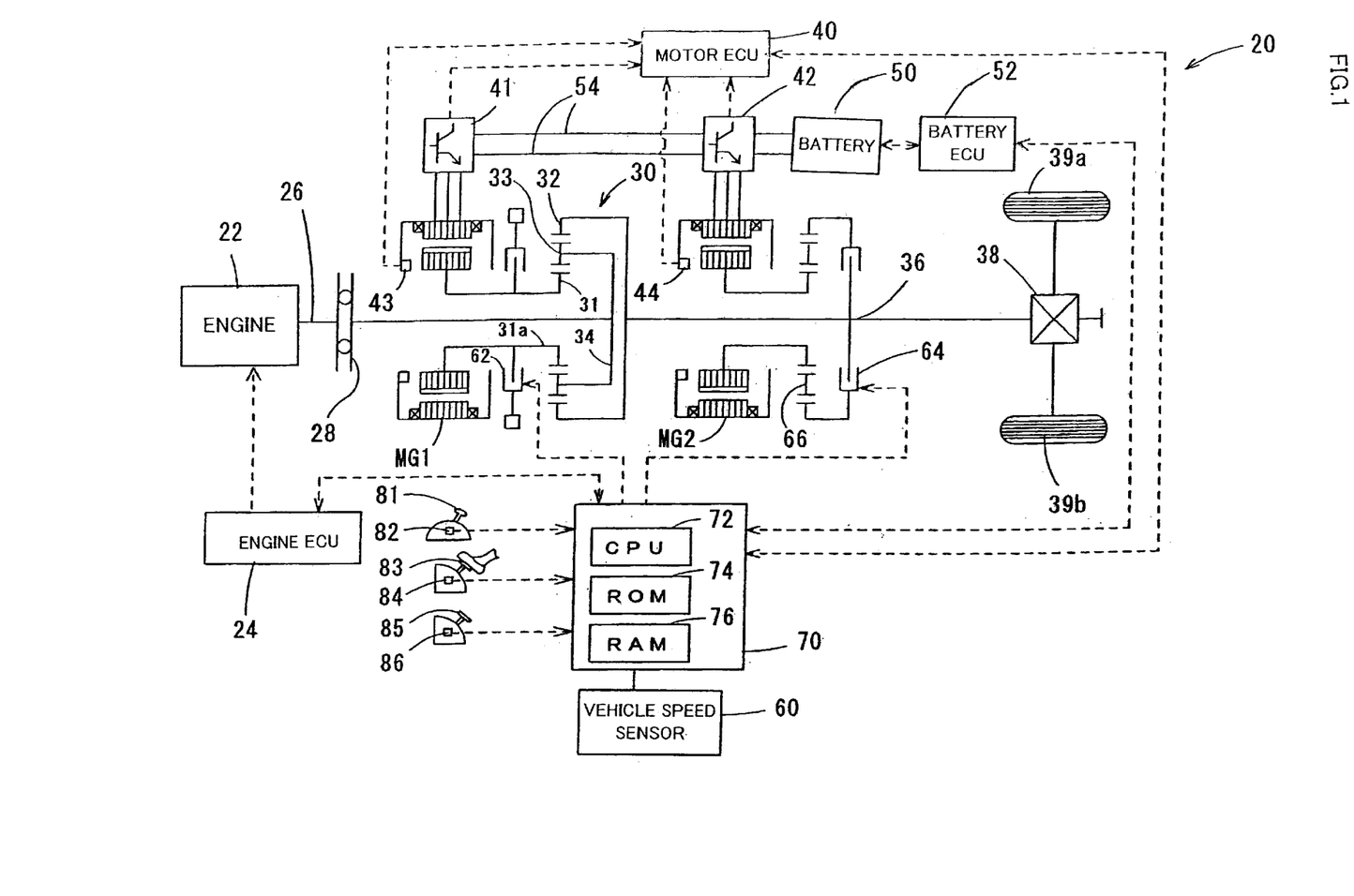
FIG. 1 schematically illustrates the structure of a hybrid vehicle 20 with a power output apparatus mounted thereon in one embodiment of the present invention.

One mode of carrying out the present invention is discussed below as a preferred embodiment. FIG. 1 schematically illustrates the structure of a hybrid vehicle 20 with a power output apparatus mounted thereon in one embodiment of the present invention. The hybrid vehicle 20 of the embodiment includes an engine 22, a triaxial power distribution integration mechanism 30 that is connected to a crankshaft 26 or an output shaft of the engine 22 via a damper 28, a motor MG1 that is connected to the power distribution integration mechanism 30 to generate electric power, another motor MG2 mechanically that is connected to the power distribution integration mechanism 30, and a hybrid electronic control unit 70 that controls the whole power output apparatus.

The engine 22 is an internal combustion engine that outputs power using a hydrocarbon fuel, such as gasoline or diesel oil. An engine electronic control unit (hereinafter referred to as engine ECU) 24 receives signals from diverse sensors that detect the driving conditions of the engine 22, and controls the operations of the engine 22 including the control of fuel injection, the control of ignition, and the regulation of the intake air flow. The engine ECU 24 communicates with the hybrid electronic control unit 70 and controls the operations of the engine 22 in response to control signals from the hybrid electronic control unit 70 while outputting data regarding the driving conditions of the engine 22 to the hybrid electronic control unit 70 according to the requirements.

The power distribution integration mechanism 30 includes a sun gear 31 as an external gear, a ring gear 32 as an internal gear arranged concentrically with the sun gear 31, multiple pinion gears 33 engaging with both the sun gear 31 and the ring gear 32, and a carrier 34 holding the multiple pinion gears 33 in such a manner that allows both revolution and rotation on its axis. Namely the power distribution integration mechanism 30 is constructed as a planetary gear mechanism that attains differential actions with the sun gear 31, the ring gear 32, and the carrier 34 as rotational elements. In the power distribution integration mechanism 30, the crankshaft 26 of the engine 22, the motor MG1, and a drive shaft 36 are respectively linked with the carrier 34, the sun gear 31, and the ring gear 32. When the motor MG1 works as an electric generator, the power of the engine 22 input via the carrier 34 is distributed into the sun gear 31 and the ring gear 32 according to their gear ratio. When the motor MG1 works as an electric motor, on the other hand, the power of the engine 22 input via the carrier 34 and the power of the motor MG1 input via the sun gear 31 are integrated and output to the ring gear 32. The ring gear 32 transmits the output power to drive wheels 39a and 39b via the drive shaft 36 and a differential gear 38. Three shafts connecting with the power distribution integration mechanism 30 as the power output apparatus are the crankshaft 26, which is the output axis of the engine 22 and connects with the carrier 34, a sun gear shaft 31a, which is the rotational axis of the motor MG1 and connects with the sun gear 31, and the drive shaft 36, which connects with the ring gear 32. A brake 62 is attached to the sun gear shaft 31a to stop rotation of the sun gear shaft 31 by means of hydraulic transmission. The operations of the brake 62 are controlled by the hybrid electronic control unit 70.

The motor MG2 is linked with the drive shaft 36 via a clutch 64 of hydraulic transmission and a reduction gear mechanism 66. The power of the motor MG2 is accordingly output to the drive shaft 36. The operations of the clutch 64 are controlled by the hybrid electronic control unit 70.

Both of the motors MG1 and MG2 are constructed as known synchronous generator motors, which are driven as an electric generator as well as an electric motor. The motors MG1 and MG2 transmit electric power from and to a battery 50 via inverters 41 and 42. A power line 54 connecting the inverters 41 and 42 with the battery 50 includes a positive terminal bus line and a negative terminal bus line shared by the two inverters 41 and 42. This arrangement enables the electric power generated by one of the motors MG1 and MG2 to be consumed by the other motor. The battery 50 is charged with the excess electric power of the motor MG1 or the motor MG2 and is discharged to supplement the insufficient electric power of the motor MG1 or the motor MG2. The battery 50 is neither charged not discharged when there is an electric power balance by the motors MG1 and MG2. The motors MG1 and MG2 are both driven and controlled by a motor electronic control unit (hereinafter referred to as motor ECU) 40. The motor ECU 40 receives signals required for driving and controlling the motors MG1 and MG2, for example, signals from rotational position detection sensors 43 and 44 that detect the rotational positions of rotors in the motors MG1 and MG2 and values of phase electric currents supplied to the motors MG1 and MG2 and detected by non-illustrated electric current sensors. The motor ECU 40 outputs switching control signals to the inverters 41 and 42. The motor ECU 40 communicates with the hybrid electronic control unit 70 and drives and controls the motors MG1 and MG2 in response to control signals from the hybrid electronic control unit 70 while outputting data regarding the driving conditions of the motors MG1 and MG2 to the hybrid electronic control unit 70 according to the requirements. The battery 50 is controlled by a battery electronic control unit (hereinafter referred to as battery ECU) 52. The battery ECU 52 receives signals required for controlling the battery 50, for example, a value of inter-terminal voltage measured by a non-illustrated voltage sensor disposed between terminals of the battery 50, a value of charge discharge electric current measured by a non-illustrated electric current sensor attached to the power line 54 connecting with an output terminal of the battery 50, and a battery temperature measured by a non-illustrated temperature sensor attached to the battery 50. The battery ECU 52 outputs data regarding the conditions of the battery 50 to the hybrid electronic control unit 70 via communication according to the requirements. The battery ECU 52 computes a state of charge (SOC) from an accumulated value of the charge discharge electric current measured by the electric current sensor for controlling the battery 50.

The hybrid electronic control unit 70 is constructed as a microprocessor including a CPU 72, a ROM 74 that stores programs, a RAM 76 that temporarily stores data, and a non-illustrated input output port, and a non-illustrated communication port. The hybrid electronic control unit 70 receives via its input port a gearshift position SP from a gearshift position sensor 82 that detects the position of a gearshift lever 81, an accelerator opening AP from an accelerator pedal position sensor 84 that detects the step-on amount of an accelerator pedal 83, a brake pedal position BP from a brake pedal position sensor 86 that detects the step-on amount of a brake pedal 85, and a vehicle speed V from a vehicle speed sensor 60. The hybrid electronic control unit 70 outputs a driving signal to a non-illustrated actuator of the brake 62 and a driving signal to a non-illustrated actuator of the clutch 64 via its output port. The hybrid electronic control unit 70 connects with the engine ECU 24, the motor ECU 40, and the battery ECU 52 via its communication port and transmits diverse control signals and data to and from the engine ECU 24, the motor ECU 40, and the battery ECU 52.

The hybrid vehicle 20 of the embodiment constructed as discussed above runs while changing over its drive mode between a low speed mode and a high speed mode. In the case of a relatively low level of the vehicle speed V, the low speed mode is set where the engine 22 is driven at a drive point of high efficiency while the brake 62 is in OFF position and the clutch 64 is in ON position. The power of the engine 22 under such conditions is subjected to torque conversion by means of the power distribution integration mechanism 30 and the motors MG1 and MG2, and is output to the drive shaft 36. In the case of a relatively high level of the vehicle speed V, on the other hand, the high speed mode is set where the engine 22 is driven while the brake 62 is in ON position, the clutch 64 is in OFF position, and the motors MG1 and MG2 are at a stop. The power of the engine 22 under such conditions is subjected to speed change at a fixed change gear ratio by the power distribution integration mechanism 30, and is directly output to the drive shaft 36. The following describes a process of changing over the drive mode.

Figure 2:
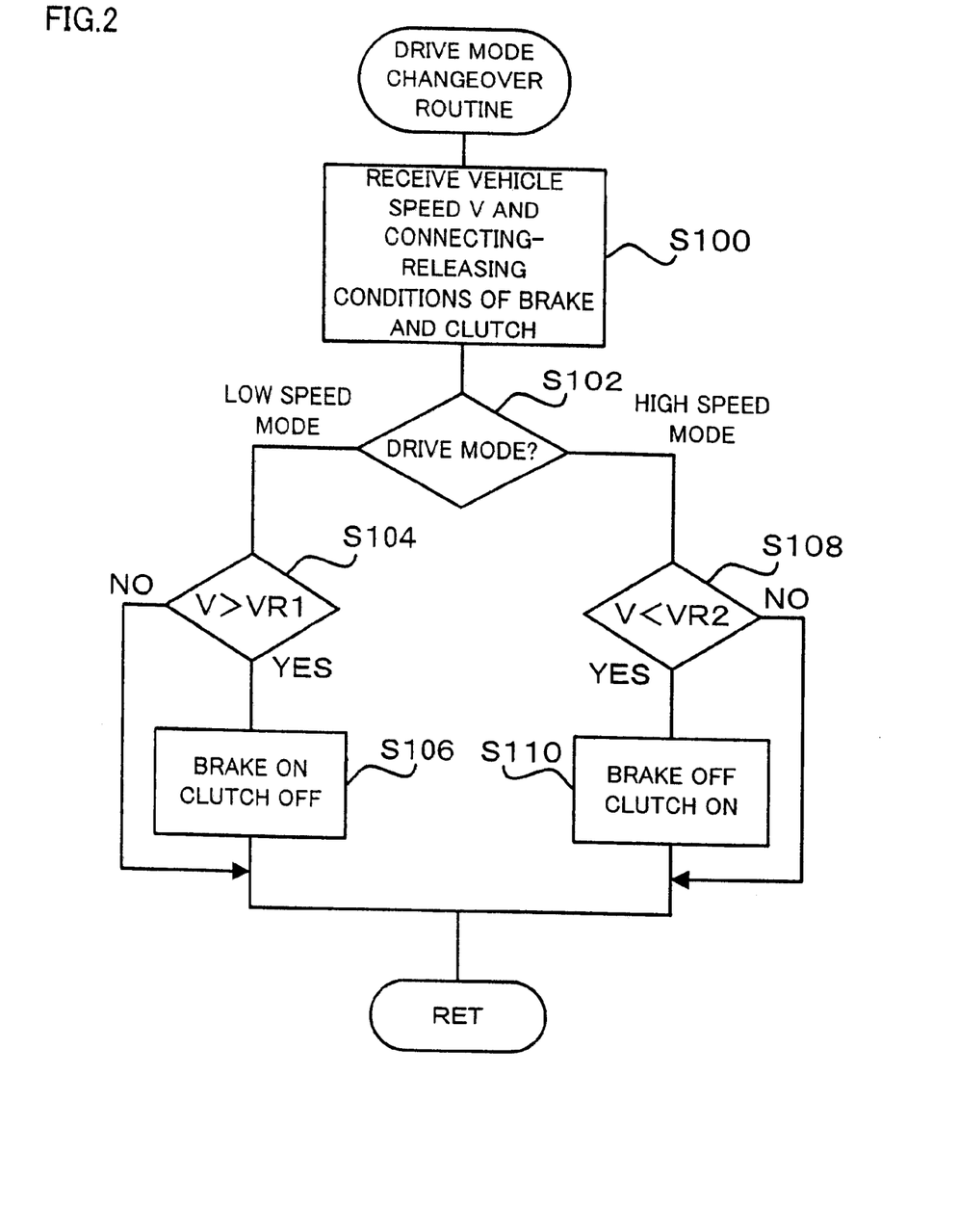
FIG. 2 is a flowchart showing a drive mode changeover routine executed by a hybrid electronic control unit 70 in the embodiment.

FIG. 2 is a flowchart showing a drive mode changeover routine executed by the hybrid electronic control unit 70 in the embodiment. This routine is iteratively carried out at predetermined time intervals (for example, at every 8 msec). When the program enters the drive mode changeover routine, the CPU 72 of the hybrid electronic control unit 70 first reads the vehicle speed V measured by the vehicle speed sensor 60 and the coupling-releasing conditions of the brake 62 and the clutch 64 (step S100), and specifies the drive mode according to the coupling-releasing conditions of the brake 62 and the clutch 64 (step S102). In this embodiment, in response to each coupling or releasing action of the brake 62 or the clutch 64, the ON-OFF state is written at a preset address of the RAM 76 in the hybrid electronic control unit 70. The CPU 72 gains access to the preset address and reads the coupling-releasing conditions of the brake 62 and the clutch 64.

In the low speed mode where the brake 62 is in OFF position and the clutch 64 is in ON position, the observed vehicle speed V is compared with a threshold value VR1 (step S104). When the vehicle speed V is greater than the threshold value VR1, the brake 62 is connected (ON position) and the clutch 64 is released (OFF position) to change over the drive mode to the high speed mode (step S106). In the high speed mode where the brake 62 is in ON position and the clutch 64 is in OFF position, on the other hand, the observed vehicle speed V is compared with another threshold value VR2, which is smaller than the threshold value VR1 (step S108). When the vehicle speed V is less than the threshold value VR2, the brake 62 is released (OFF position) and the clutch 64 is connected (ON position) to change over the drive mode to the low speed mode (step S110). The threshold values VR1 and the VR2 are set as reference vehicle speeds to change over the driver mode between the low speed mode and the high speed mode. A hysteresis is given to the setting, in order prevent undesirably frequent changeover of the drive mode when the vehicle runs at a speed close to the reference vehicle speed for changing over the drive mode. In one example of the setting, the threshold value VR1 is equal to 80 km/h and the threshold value VR2 is equal to 70 km/h. The setting of the threshold values VR1 and VR2 depends upon the application of the vehicle.

Figure 3:
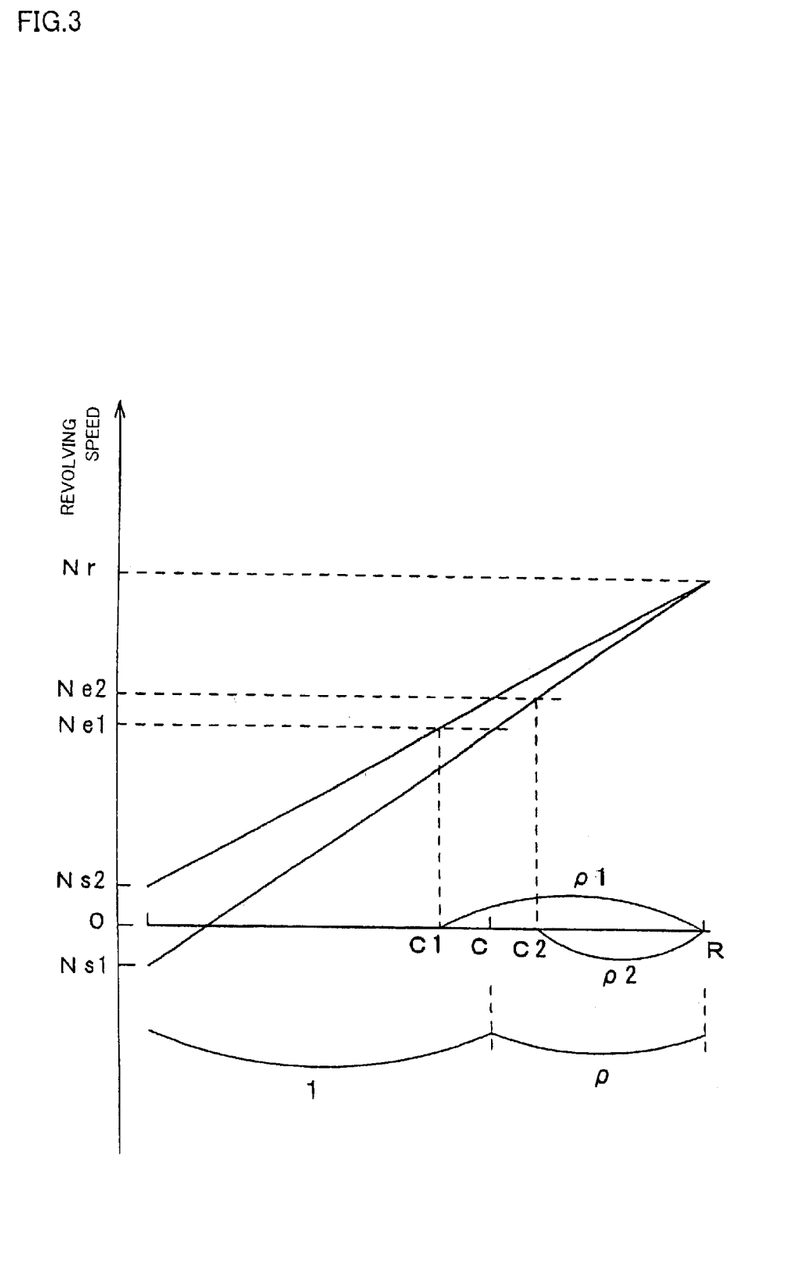
FIG. 3 shows a process of setting a gear ratio ρ of a power distribution integration mechanism 30 by utilizing a collinear diagram in the embodiment.

In the hybrid vehicle 20 of the embodiment, a gear ratio $\rho$ of the power distribution integration mechanism 30 (the number of teeth of the sun gear 31 to the number of teeth of the ring gear 32) is regulated to keep a revolving speed Ns of the sun gear shaft 31a within a predetermined revolving speed range including a value '0' (Ns1 to Ns2) in the process of changing over the drive mode. Here it is assumed that the hybrid vehicle 20 runs on a flat road at a speed close to the threshold value VR1 or the threshold value VR2. The ring gear 32 has a revolving speed Nr, and a driving area of the engine 22 that ensures efficient output of general power required by a driver in this driving state has a revolving speed range of Ne1 to Ne2. The gear ratio $\rho$ of the power distribution integration mechanism 30 is regulated to make the sun gear shaft 31a rotate in a revolving speed range defined by revolving speeds Ns1 and Ns2. FIG. 3 is a collinear diagram in this state. For rotation of the sun gear shaft 31a under such conditions, the carrier 34 is required to be at least in a range of a point C1 to a point C2 on the abscissa. Namely the gear ratio $\rho$ of the power distribution integration mechanism 30 should be in a range of $\rho2$ to $\rho1$. In the hybrid vehicle 20 of the embodiment, the gear ratio $\rho$ of the power distribution integration mechanism 30 is set to make the revolving speed Ns of the sun gear shaft 31a equal to the value '0' when the ring gear 32 rotates at the revolving speed Nr and the engine 22 is driven at an intermediate revolving speed between the revolving speed Ne1 and Ne2 to output general power in this driving state. In the collinear diagram of FIG. 3, the setting causes a point C on the abscissa to be the carrier shaft.

Figure 4:
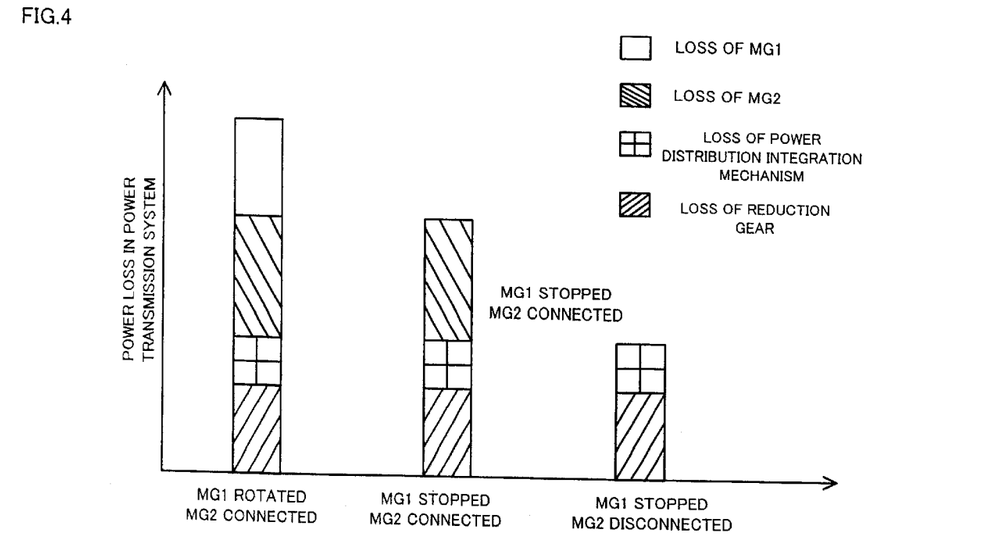
FIG. 4 shows a relationship between the driving conditions of motors MG1 and MG2 and the power loss in a power transmission system in the hybrid vehicle 20.
Figure 5:
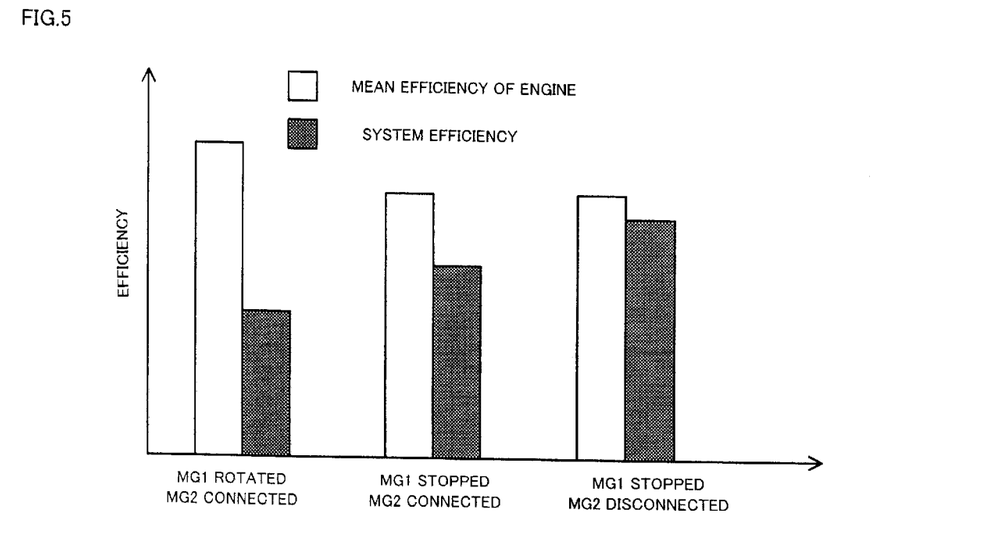
FIG. 5 shows a relationship between the driving conditions of the motors MG1 and MG2, the efficiency of an engine 22, and the total efficiency (system efficiency) of the hybrid vehicle 20.

FIG. 4 shows a relationship between the driving conditions of the motors MG1 and MG2 and the power loss in a power transmission system in the hybrid vehicle 20. FIG. 5 shows a relationship between the driving conditions of the motors MG1 and MG2, the efficiency of the engine 22, and the total efficiency (system efficiency) of the hybrid vehicle 20. As shown in FIG. 4, when the motors MG1 and MG2 are at a stop, the power loss in the power transmission system is reduced accordingly. As shown in FIG. 5, when the brake 62 fixes the sun gear shaft 31a and stops the operations of the motor MG1, the engine 22 is driven at a drive point slightly deviated from the optimum drive point. This lowers the efficiency of the engine 22 while decreasing the power loss of the motor MG1 to zero. The total efficiency (system efficiency) of the hybrid vehicle 20 is accordingly enhanced. Under such conditions, the clutch 64 is released (OFF position) to disconnect the motor MG2 and stop the operations of the motor MG2. This decreases the power loss of the motor MG2 to zero and further enhances the total efficiency of the hybrid vehicle 20.

As discussed above, in the hybrid vehicle 20 of the embodiment, the brake 62 functions to fix the sun gear shaft 31a and stop the operations of the motor MG1, thus enhancing the total efficiency of the hybrid vehicle 20. The clutch 64 functions to disconnect the motor MG2 and stop the operations of the motor MG2, thus further enhancing the total efficiency of the hybrid vehicle 20. In the hybrid vehicle 20 of the embodiment, the gear ratio ρ is regulated to keep the revolving speed Ns of the sun gear shaft 31a within the predetermined revolving speed range including the value '0' in the process of changing over the drive mode. This arrangement effectively prevents significant deviation of the drive point of the engine 22 in response to each coupling or releasing action (ON-OFF operation) of the brake 62, while reducing the load applied to the brake 62. The power of the engine 22 driven at a drive point of high efficiency is subjected to the torque conversion by the power distribution integration mechanism 30, the motor MG1, and the motor MG2, and is output to the drive shaft 36.

In the hybrid vehicle 20 of the embodiment, the gear ratio ρ of the power distribution integration mechanism 30 is set to make the sun gear shaft 31a rotate in the predetermined revolving speed range including the value '0', when the engine 22 is driven in the driving area for efficiently outputting the general power required by the driver in the process of changing over the drive mode. In other words, the gear ratio ρ is set to drive the engine 22 in the revolving speed range in the driving area of high efficiency, when the sun gear shaft 31a is rotated in the predetermined revolving speed range including the value '0' and the general power required by the driver is output from the engine 22 in the process of changing over the drive mode. Setting of the gear ratio ρ of the power distribution integration mechanism 30 in this manner enhances the total efficiency of the hybrid vehicle 20. The setting of the gear ratio ρ of the power distribution integration mechanism 30 depends upon the characteristics of the engine 22 and the application of the vehicle.

In the hybrid vehicle 20 of the embodiment, the hysteresis is given to the setting of the threshold values VR1 and VR2, in order to prevent frequent changeover of the drive mode between the low speed mode and the high speed mode. The setting may not have any hysteresis in the process of changing over the driver mode between the low speed mode and the high speed mode. In the hybrid vehicle 20 of the embodiment, the drive mode is changed over from the low speed mode to the high speed mode when the vehicle speed V is greater than the threshold value VR1, while being changed over from the high speed mode to the low speed mode when the vehicle speed V is less than the threshold value VR2. The changeover of the drive mode from the high speed mode to the low speed mode may be implemented, based on a different factor other than the vehicle speed V.

In the hybrid vehicle 20 of the embodiment, the drive mode is changed over between the low speed mode and the high speed mode. In the low speed mode, the power of the engine 22 is subjected to the torque conversion by the power distribution integration mechanism 30 and the motors MG1 and MG2 and is output to the drive shaft 36, while the brake 62 is in OFF position and the clutch 64 is in ON position. In the high speed mode, the power of the engine 22 is directly output to the drive shaft 36, while the brake 62 is in ON position and the clutch 64 is in OFF position. The hybrid vehicle may have other drive modes, that is, a drive mode in which both the brake 62 and the clutch 64 are in ON position and a drive mode in which both the brake 62 and the clutch 64 are in OFF position.

The above embodiment regards the hybrid vehicle with the power output apparatus mounted thereon. The power output apparatus may be mounted on diverse vehicles other than automobiles, boats and ships, aircraft, and other moving bodies, as well as a variety of machines and equipment other than the moving bodies, for example, construction machines as the power source.

The above embodiment is to be considered in all aspects as illustrative and not restrictive. There may be many modifications, change, and alterations without departing from the scope or sprit of the main characteristics of the present invention. All changes within the meaning and range of equivalency of the claims are therefore intended to be embraced therein.

What is claimed is:

1. A power output apparatus that outputs power to a drive shaft, said power output apparatus comprising:

an internal combustion engine;

a drive shaft electric motor that is mechanically linked with said drive shaft and inputs and outputs power into and from said drive shaft;

a triaxial power input output module that is connected to three shafts, that is, an output shaft of said internal combustion engine, said drive shaft, and a rotational shaft and, when powers input into and output from any two shafts among the three shafts are specified, wherein the triaxial power input output module determines power input into and output from a residual shaft, based on the specified powers;

a rotational shaft electric motor that inputs and outputs power into and from said rotational shaft;

a rotation stop module that fixes said rotational shaft to stop rotation of said rotational shaft; and an electric motor connecting and releasing module that mechanically connects said drive shaft with said drive shaft electric motor and releases the mechanical connection of said drive shaft with said drive shaft electric motor.

2. A power output apparatus in accordance with claim 1, said power output apparatus further comprising:

a controller that controls said rotation stop module to stop the rotation of said rotational shaft and controls said electric motor connecting and releasing module to release the mechanical connection of said drive shaft with said drive shaft electric motor, when a predetermined rotation stop condition is fulfilled.

3. A power output apparatus in accordance with claim 2, said power output apparatus further comprising:

a revolving speed sensor that measures a revolving speed of said drive shaft, wherein the predetermined rotation stop condition adopted in said controller is that the revolving speed of said drive shaft measured by said revolving speed sensor is not less than a first changeover revolving speed.

4. A power output apparatus in accordance with claim 2, wherein said controller controls said rotation stop module to cancel the stop of the rotation of said rotational shaft and controls said electric motor connecting and releasing module to mechanically connect said drive shaft with said drive shaft electric motor, when a predetermined stop cancellation condition is fulfilled.

5. A power output apparatus in accordance with claim 4, said power output apparatus further comprising:
a revolving speed sensor that measures a revolving speed of said drive shaft,
wherein the predetermined stop cancellation condition adopted in said controller is that the revolving speed of said drive shaft measured by said revolving speed sensor is not greater than a second changeover revolving speed.

6. A power output apparatus in accordance with claim 4, said power output apparatus further comprising:
a revolving speed sensor that measures a revolving speed of said drive shaft,
wherein the predetermined rotation stop condition adopted in said controller is that the revolving speed of said drive shaft measured by said revolving speed sensor is not less than a first changeover revolving speed, and the predetermined stop cancellation condition adopted in said controller is that the revolving speed of said drive shaft measured by said revolving speed sensor is not greater than a second changeover revolving speed.

7. A power output apparatus in accordance with claim 1, said power output apparatus further comprising:
a controller that controls said rotation stop module to cancel the stop of the rotation of said rotational shaft and controls said electric motor connecting and releasing module to mechanically connect said drive shaft with said drive shaft electric motor, when a predetermined stop cancellation condition is fulfilled.

8. A power output apparatus in accordance with claim 7, said power output apparatus further comprising;
a revolving speed sensor that measures a revolving speed of said drive shaft,
wherein the predetermined stop cancellation condition adopted in said controller is that the revolving speed of said drive shaft measured by said revolving speed sensor is not greater than a changeover revolving speed.

9. A power output apparatus in accordance with claim 1, said power output apparatus further comprising:
a revolving speed sensor that measures a revolving speed of said drive shaft; and
a controller that controls said rotation stop module to stop the rotation of said rotational shaft and controls said electric motor connecting and releasing module to release the mechanical connection of said drive shaft with said drive shaft electric motor, when a first changeover condition is fulfilled where the revolving speed of said drive shaft measured by said revolving speed sensor is over a preset changeover revolving speed range,
said controller controlling said rotation stop module to cancel the stop of the rotation of said rotational shaft and controlling said electric motor connecting and releasing module to mechanically connect said drive shaft with said drive shaft electric motor, when a second changeover condition is fulfilled where the revolving speed of said drive shaft measured by said revolving speed sensor is below the preset changeover revolving speed range.

10. A power output apparatus in accordance with claim 9, wherein said triaxial power input output module is regulated to make a revolving speed of said rotational shaft within a predetermined revolving speed range including a value '0', when said drive shaft is rotated in the preset changeover revolving speed range against a general required power, said internal combustion engine is driven to enable a power corresponding to the general required power to be efficiently output from said internal combustion engine, and said rotational shaft electric motor and said drive shaft electric motor are driven to output the general required power to said drive shaft.

11. A power output apparatus in accordance with claim 9, wherein said triaxial power input output module is regulated to enable said internal combustion engine to be driven in a predetermined efficient driving area, when said drive shaft is rotated in the preset changeover revolving speed range against a general required power, and said rotational shaft electric motor and said drive shaft electric motor are driven in order to cause a power corresponding to the general required power output from said internal combustion engine to be transmitted to said drive shaft as the general required power and in order to rotate said rotational shaft within a predetermined revolving speed range including a value '0'.

12. A power output apparatus in accordance with claim 1, said power output apparatus further comprising:
a transmission that is interposed between said drive shaft electric motor and said drive shaft to change an input revolving speed and output a resulting revolving speed.

13. An automobile, comprising:
an internal combustion engine;
a drive shaft electric motor that is mechanically linked with a drive shaft, which is connected to an axle, and inputs and outputs power into and from said drive shaft;
a triaxial power input output module that is connected to three shafts, that is, an output shaft of said internal combustion engine, said drive shaft, and a rotational shaft and, when powers input into and output from any two shafts among the three shafts are specified, wherein the triaxial power input output module determines power input into and output from a residual shaft, based on the specified powers;
a rotational shaft electric motor that inputs and outputs power into and from said rotational shaft;
a rotation stop module that fixes said rotational shaft to stop rotation of said rotational shaft;
an electric motor connecting and releasing module that mechanically connects said drive shaft with said drive shaft electric motor and releases the mechanical connection of said drive shaft with said drive shaft electric motor;
a vehicle speed sensor that measures a vehicle speed; and
a controller that controls said rotation stop module to stop the rotation of said rotational shaft and controls said electric motor connecting and releasing module to release the mechanical connection of said drive shaft with said drive shaft electric motor, when a first changeover condition is fulfilled where the vehicle speed measured by said vehicle speed sensor is over a preset changeover vehicle speed range,
said controller controlling said rotation stop module to cancel the stop of the rotation of said rotational shaft and controlling said electric motor connecting and releasing module to mechanically connect said drive shaft with said drive shaft electric motor, when a second changeover condition is fulfilled where the vehicle speed measured by said vehicle speed sensor is below the preset changeover vehicle speed range.

14. An automobile in accordance with claim 13, wherein said triaxial power input output module is regulated to make a revolving speed of said rotational shaft within a predetermined revolving speed range including a value '0', when said drive shaft is rotated in the preset changeover revolving speed range against a general required power, said internal combustion engine is driven to enable a power corresponding to the general required power to be efficiently output from said internal combustion engine, and said rotational shaft electric motor and said drive shaft electric motor are driven to output the general required power to said drive shaft.

15. An automobile in accordance with claim 13, wherein said triaxial power input output module is regulated to enable said internal combustion engine to be driven in a predetermined efficient driving area, when said drive shaft is rotated in the preset changeover revolving speed range against a general required power, and said rotational shaft electric motor and said drive shaft electric motor are driven in order to cause a power corresponding to the general required power output from said internal combustion engine to be transmitted to said drive shaft as the general required power and in order to rotate said rotational shaft within a predetermined revolving speed range including a value '0'.

16. An automobile in accordance with claim 13, said automobile further comprising:

a transmission that is interposed between said drive shaft electric motor and said drive shaft to change an input revolving speed and output a resulting revolving speed.

* * * * *